United States Patent
Bischof et al.

(10) Patent No.: US 7,168,660 B2
(45) Date of Patent: Jan. 30, 2007

(54) SYSTEM FOR CAPTURING AND RECOVERING FREE-FLYING OBJECTS IN SPACE

(75) Inventors: Bernd Bischof, Ganderkesee (DE); Juergen Starke, Bremen (DE); Hansjuergen Guenther, Bremen (DE); Peter Foth, Weyhe-Leeste (DE); Lothar Kerstein, Sottrum (DE)

(73) Assignee: EADS Space Transportaiton GmbH, Bremen (DE)

( * ) Notice: Subject to any disclaimer, the term of this patent is extended or adjusted under 35 U.S.C. 154(b) by 354 days.

(21) Appl. No.: 10/943,769

(22) Filed: Sep. 17, 2004

(65) Prior Publication Data

US 2005/0103939 A1    May 19, 2005

(30) Foreign Application Priority Data

Sep. 17, 2003   (DE) ................................ 103 42 954

(51) Int. Cl.
*B64G 1/10* (2006.01)
*B64G 1/66* (2006.01)

(52) U.S. Cl. ................................ 244/158.2; 244/158.1

(58) Field of Classification Search ............ 244/158.1, 244/158.2, 159.4, 171.5
See application file for complete search history.

(56) References Cited

U.S. PATENT DOCUMENTS

| | | | | |
|---|---|---|---|---|
| 3,004,735 A | * | 10/1961 | Kinard | 250/389 |
| H1383 H | * | 12/1994 | Kaplan et al. | 342/372 |
| 5,865,401 A | * | 2/1999 | Watkins | 244/158.2 |
| 6,299,107 B1 | * | 10/2001 | Kong et al. | 244/172.4 |

* cited by examiner

*Primary Examiner*—Robert P. Swiatek
(74) *Attorney, Agent, or Firm*—W. F. Fasse; W. G. Fasse

(57) ABSTRACT

Capture devices are mounted on a space platform such as a spacecraft or utility satellite. Each capture device includes a folded capture net stored in a housing, guide weights connected to the net and received in spring-loaded ejection tubes oriented at an acute angle relative to the axis of the housing around the perimeter thereof, and a spring-loaded releasable cover that is connected to the net, covers the net in the housing, and holds the weights in the ejection tubes. When the cover is released, it is spring-ejected from the housing while pulling out and unfolding the net, and the weights are spring-ejected out of the ejection tubes while spreading out the net. After the net wraps around a free-flying target object in space, net closure mechanisms reel-in a net pursing line to close the net, which is connected to the space platform by a tether line on a winch.

19 Claims, 4 Drawing Sheets

SYSTEM FOR CAPTURING AND RECOVERING FREE-FLYING OBJECTS IN SPACE

PRIORITY CLAIM

This application is based on and claims the priority under 35 U.S.C. §119 of German Patent Application 103 42 954.9, filed on Sep. 17, 2003, the entire disclosure of which is incorporated herein by reference.

FIELD OF THE INVENTION

The invention relates to a system for capturing and recovering or rescuing free-flying objects in space, such as satellites, space junk, or untethered astronauts. The system uses a net for capturing the object.

BACKGROUND INFORMATION

The need exists to be able to capture and recover or rescue various target objects that are free-flying in space, for example a failed or decommissioned satellite, the burned-out upper stage of a rocket, any manner of so-called space junk or space trash, or even an astronaut who has become untethered from a spacecraft during extra vehicular activities and is in danger of drifting away into space.

Various systems have been proposed or even implemented for capturing and recovering such free-flying objects in space. For example, it is known to use a system including a capture net connected to a spacecraft by a tether line and ejected from the spacecraft to enclose and capture the intended target object. In the known system, weights are attached to the outer edge or rim of the capture net, which is launched from an associated net launching mechanism on the spacecraft, with a spin imposed on the net in such a manner so that centrifugal forces acting on the weights will cause the net to be unfolded or pulled open around the target object. Furthermore, for the purpose of capturing objects in space, various systems using relatively complex robotic graspers and the like are also known. Such systems are generally controlled from the spacecraft or other orbital platform in space. All of the known systems have suffered disadvantages of complexity, difficulty in operation, and a capture success rate that should be further improved.

SUMMARY OF THE INVENTION

In view of the above, it is an object of the invention to provide a system and device of the above mentioned general type using a net to capture and recover a free-flying object in space, which is as simple as possible, yet robust, relatively free of malfunctions and the like, and highly functional and effective for its intended purpose, while also being highly flexibly adaptable to various different capture and recovery applications. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a system for capturing a target object in space, wherein the system comprises at least one capture device mounted on a space platform such as a spacecraft or a utility or service satellite. The capture device includes a capture net with at least four guide weights connected to an outer perimeter edge or rim of the net. The capture net is initially stored in a folded condition in the capture device. The guide weights are initially respectively held in respective ejection arrangements of the capture device. In operation, the net is released and ejected from the capture device, and the guide weights are released and ejected from the ejection arrangements respectively along ejection axes oriented at an angle relative to the ejection axis of the capture net. Thereby, the guide weights are accelerated along the weight ejection axes by the ejection arrangements.

Preferably, the capture device comprises a housing in which the capture net is initially stored in a folded condition, and which includes the ejection arrangements that each respectively comprise a weight ejection tube and a compressed ejection spring acting on the respective guide weight that is initially stored and held in the allocated weight ejection tube. The weight ejection tubes are arranged equidistant from one another around the perimeter of a circle about the central circular axis of the housing, which corresponds to the ejection axis of the capture net. Also, each weight ejection tube is oriented with its tube axis along the respective weight ejection axis at an angle relative to the net ejection axis as mentioned above. The weight ejection tubes are incorporated in or connected to the outer perimeter of the housing. When the respective weight is released, the compressed ejection spring drives and accelerates the respective guide weight out of the ejection tube along the respective weight ejection axis.

Preferably, two of the four guide weights each respectively incorporate a net closing or pursing mechanism connected to and adapted to pull or reel-in a net pursing line that connects the four guide weights to one another and/or entirely spans around the free edge or perimeter rim of the capture net. The net closing or pursing mechanisms are automatically activated after a prescribed time has elapsed following the ejection of the guide weights from the weight ejection tubes. Thereby, the open perimeter of the capture net is at least partially or substantially closed with the net spanning around the captured target object, whereby a loss or escape of the captured object out of the capture net is reliably prevented.

It is a significant advantage, among others, of the inventive system, that it does not require a separate launching or ejecting apparatus. Instead, each individual capture device is independent, complete, and self-sufficient. It is merely necessary to trigger the release of the capture net and the guide weights, e.g. by remote control from the space platform (or from an earth-based control station via the space platform) on which the capture device is arranged.

Another advantage is that the inventive system can be used to capture essentially any desired target object having essentially any configuration or size, because the appropriately dimensioned and selected capture net will simply enclose the target object regardless of the configuration thereof. It is not necessary to provide a specialized grasper device or grasping adapter to mate with or grasp a particular structural shape of the target object.

Also, possible motions of the target object during the capture procedure are absolutely not a problem for the successful functioning of the capture and recovery system according to the invention. The space platform simply needs to maneuver into the vicinity of the target object, while generally or approximately matching the speed and orbital path of the target object, and then "aim" and eject the capture net toward the target object, with sufficient accuracy to ensure that the target object will be received within the span of the net. Furthermore, a safe spacing distance can be maintained between the target object and the space platform, because the net can be ejected toward the target object from quite some distance, whereby the operating or capturing distance is essentially limited by the length of the net tether line connecting the capture net to the space platform.

BRIEF DESCRIPTION OF THE DRAWINGS

In order that the invention may be clearly understood, it will now be described in connection with an example embodiment thereof, with reference to the accompanying drawings, wherein.

DETAILED DESCRIPTION OF A PREFERRED EXAMPLE EMBODIMENT AND OF THE BEST MODE OF THE INVENTION

Figure 1:
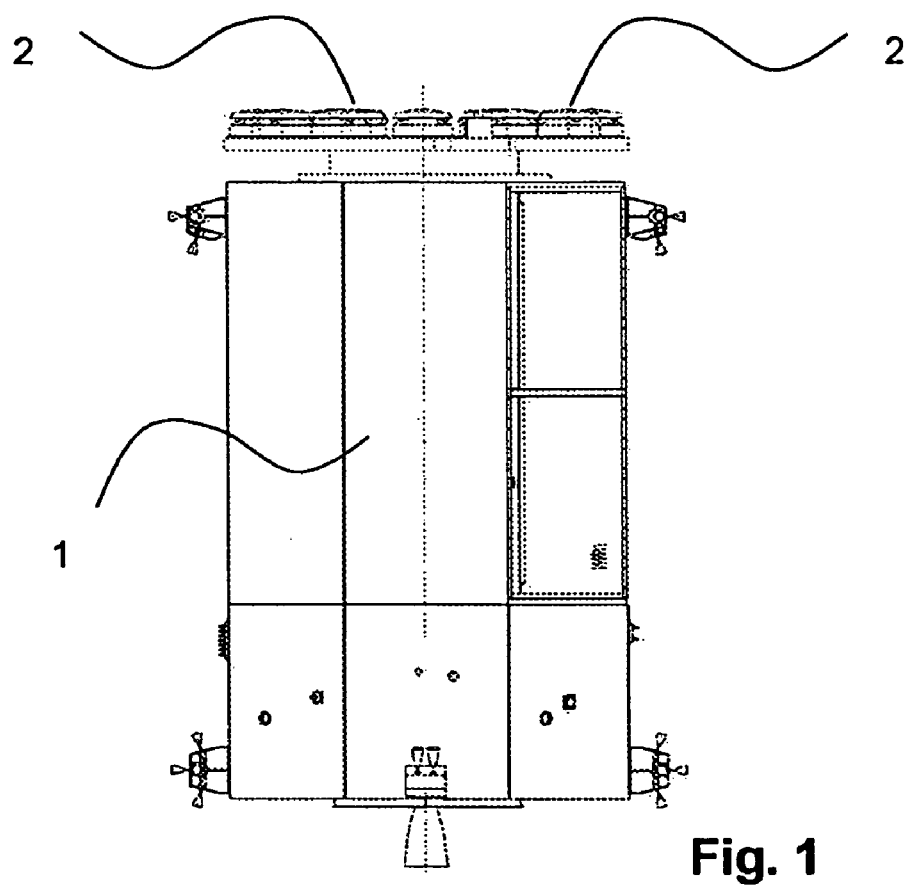
FIG. 1 is a schematic side elevation view of a system according to the invention including plural capture devices mounted on an end of a utility or service satellite as a space platform.
Figure 2:
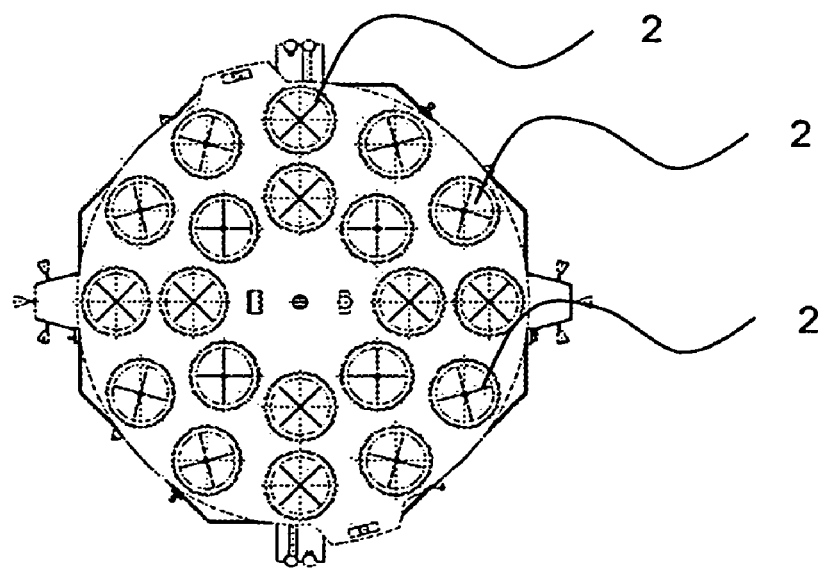
FIG. 2 is a schematic top plan view or end view of the system according to FIG. 1.
Figure 3:
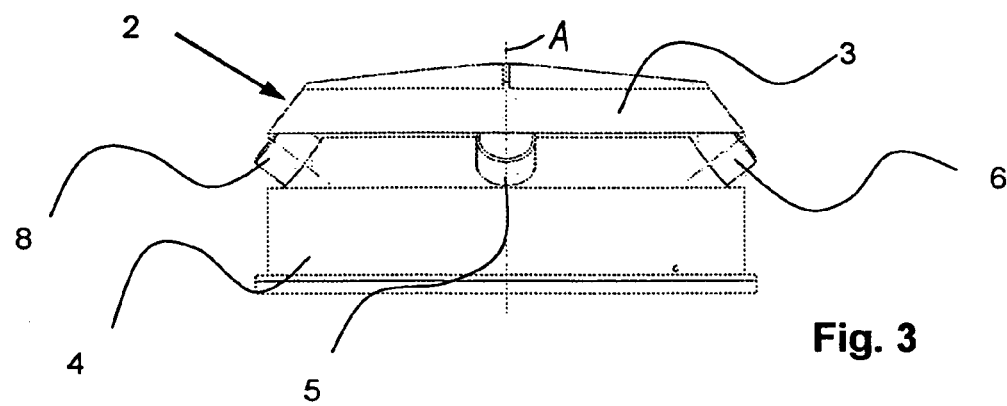
FIG. 3 is a schematic side elevation view of a single capture device as may be used in the system according to FIG. 1.
Figure 4:
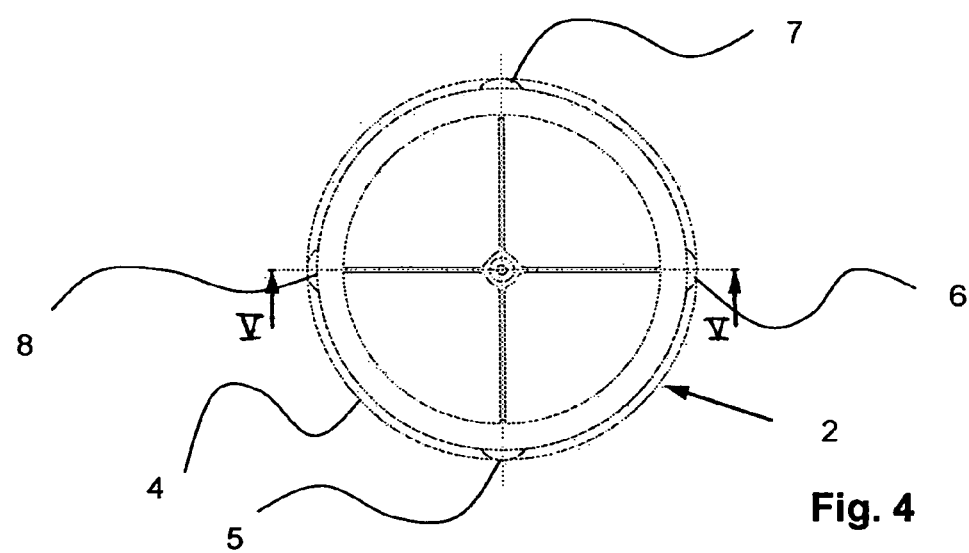
FIG. 4 is a schematic top plan view of the capture device of FIG. 3.

FIGS. 1 and 2 schematically show an overall system according to the invention, for capturing and recovering a free-flying object in space. The target object may, for example, be man-made systems that have been deactivated or decommissioned and are not to be activated again, such as satellites of which the operating life has run-out, or burned-out rocket upper stages. Alternatively, the target object may be any other form of "space junk", or even a natural satellite. Also, the target object may be a spacecraft, or an astronaut floating freely or in an uncontrolled manner in space.

The inventive system includes a space platform 1 and a plurality of capture devices 2 mounted on one end of the space platform 1. The space platform 1 may be any suitable spacecraft, space station, utility or service satellite, or the like, but generally includes its own propulsion and maneuvering system, power system, communication and control systems, and the like. The capture devices 2 mounted on one end of the space platform 1 can be activated and deployed from the space platform 1 or by remote-control from an earth-based control station via the space platform 1, so as to capture and recover a free-flying target object 15 (see FIGS. 8 and 9). Then the captured target object may be transported, e.g. towed by the space platform 1.

In the present example embodiment, the system includes twenty capture devices 2 mounted on one end of the space platform 1. In general, it is advantageous to provide at least ten of such capture devices 2 on a space platform 1, in order to allow at least ten successive deployments in ten capture and recovery missions, or multiple deployments in a large or complex mission, because each capture device 2 is essentially a single-use device. The plural capture devices 2 also provide redundancy for the case of a failure of a given capture device. A representative capture device 2 will now be described in further detail in connection with FIGS. 3 to 7.

Each capture device 2 includes a generally cylindrical housing 4 with a releasable or ejectable cover 3 arranged thereon. A capture net 9 is initially stored in a folded condition in an inner space or cavity of the housing 4 covered by the cover 3. The device 2 further includes a total of (at least or preferably exactly) four guide weights 5, 6, 7 and 8 that are respectively connected to the perimeter of the capture net 9 and are respectively received or stored in four weight ejection tubes 25 incorporated into the outer perimeter of the housing 4. The weights 5 to 8 may be integrated directly into the structure of the net 9, directly connected to the perimeter edge or rim of the net 9, or connected to the net 9 by suitable lead-lines. All of these variants are regarded as having the weights "connected" to the net. The net 9 is also connected to the cover 3.

As can be see in FIGS. 4 to 7, the four weight ejection tubes 25 are generally cylindrical tubes incorporated in or connected to the housing 4, equidistant from one another around the circular perimeter of the housing 4. Moreover, the weight ejection tubes 25 each extend along a weight ejection axis E that is tilted at an angle relative to the cylinder axis of the housing 4 which corresponds to a net ejection axis A. Particularly, this angle is an acute angle preferably in the range of 30 to 70°, and more preferably in the range of 40 to 60°.

The guide weights 5 to 8 are respectively received in the weight ejection tubes 25 and bear against (or are beared against by) a compressed spiral ejection spring 10, which urges or biases the respective guide weight 5 to 8 out of the respective ejection tube 25 along the associated weight ejection axis E. In this example embodiment, each one of the guide weights 5 to 8 has a mass of approximately 1 kg. The spiral ejection springs 10 are dimensioned appropriately to achieve a suitable acceleration of the respective guide weights 5 to 8 upon their release and ejection out of the ejection tubes 25 for deploying and spreading the net 9, as will be described below.

Figure 5:
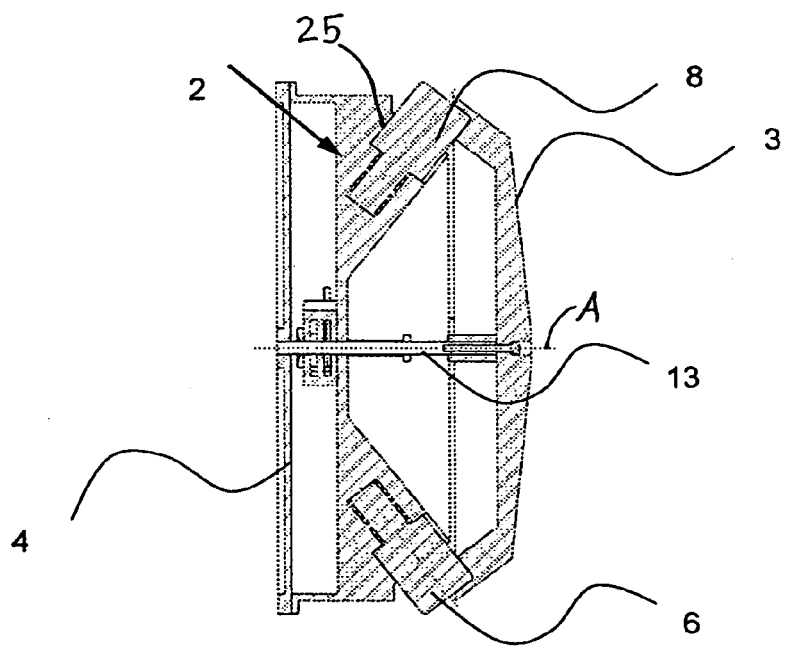
FIG. 5 is a side sectional view of the capture device of FIGS. 3 and 4, along the section line V—V of FIG. 4.
Figure 6:
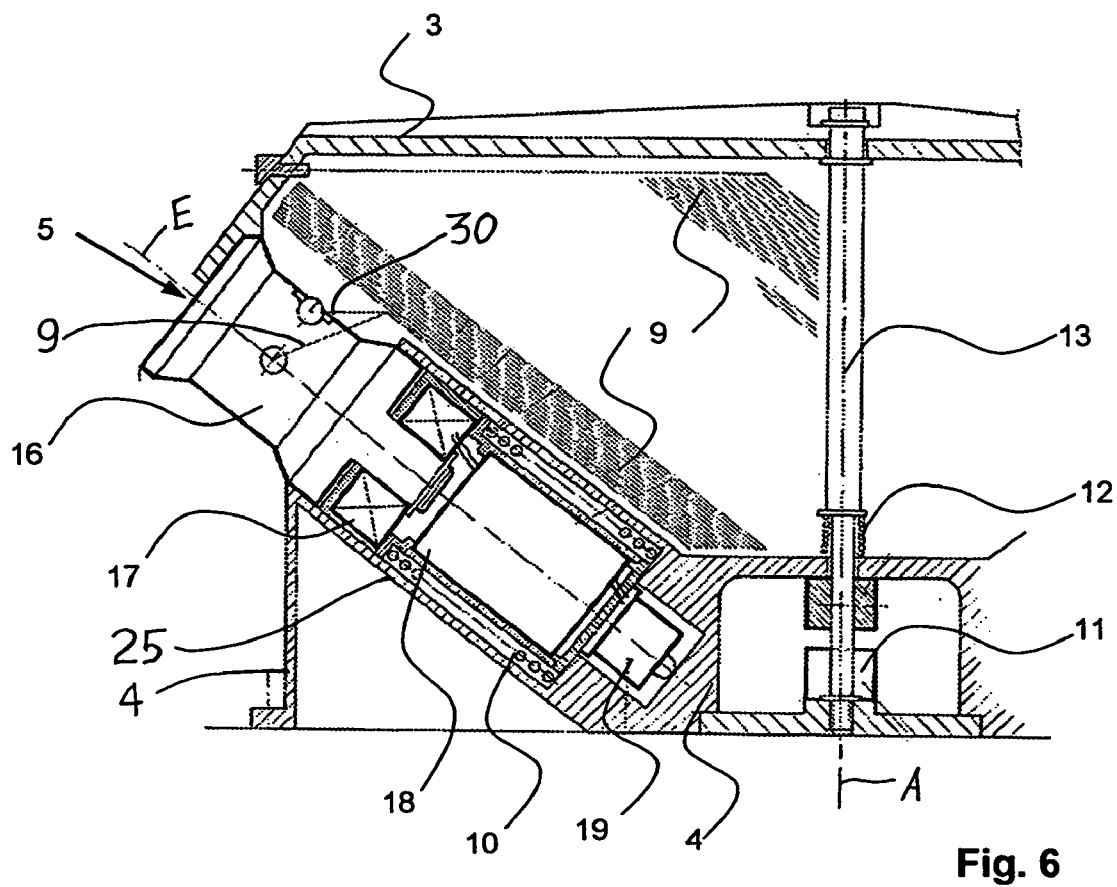
FIG. 6 is an enlarged detail sectional view of a portion of the capture device of FIGS. 3 to 5.
Figure 7:
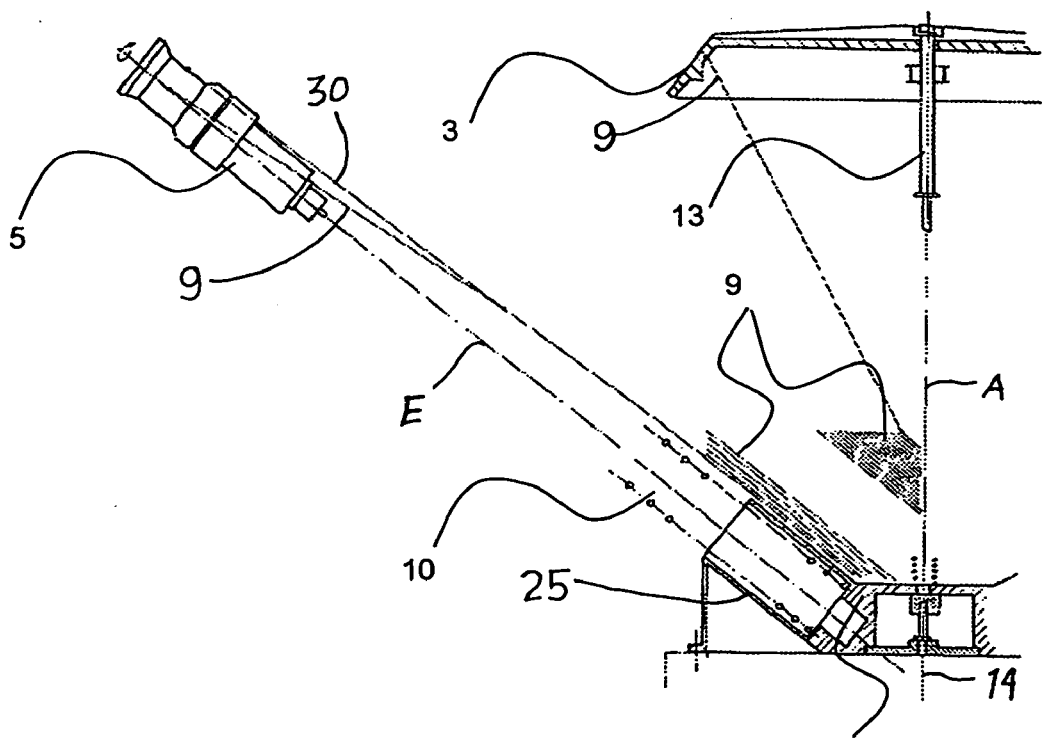
FIG. 7 is a sectional view of the portion of the capture device as shown in FIG. 6, but at a stage of ejecting the capture net and the guide weight.

As can be seen especially in FIGS. 5 and 6, each guide weight, e.g. the guide weight 5, is held in the spring-loaded condition in the weight ejection tube 25 by the cover 3 in its closed and secured position on the housing 4. When the cover 3 is released, it will simultaneously uncover and release both the net 9 along the net ejection axis A and the guide weights 5 to 8 along the respective weight ejection axes E extending radially outwardly along an inverted cone about the axis A. More particularly, the cover 3 is secured centrally by a rod 13 to the housing 4, and the rod 13 is spring-loaded by a spiral ejection spring 12 arranged coaxially thereon. The device 2 further includes a bolt cutter 11, or any other type of actuatable rod release mechanism, e.g. a pyrotechnic device.

When the bolt cutter 11 or other rod release mechanism is activated, e.g. under remote control from or via the space platform 1, the rod 13 is thereby released from the housing 4, and the pre-loaded ejection spring 12 forcefully ejects the cover 3 away from the housing 4 in the direction of the net ejection axis A. Thereby, the cover 3, which is connected to the net 9, takes the net 9 along with it so as to unfold and deploy the net in the direction of the net ejection axis A.

Meanwhile also, the guide weights 5 to 8 have been released by the removal or opening of the cover 3, whereby the pre-loaded ejection springs 10 drive the guide weights 5 to 8 out of the weight ejection tubes 25 in the directions of the weight ejection axes E. Since the guide weights 5 to 8 are also connected to the net 9, the weights 5 to 8 pull the net 9 radially outwardly so as to unfold and spread out the net 9.

The capture net 9 is further connected, e.g. centrally, by a tether line 14 directly or indirectly (e.g. via the housing 4 of the device 2) to the orbital or space platform 1. In the present example embodiment, this tether line 14 has a length of about 60 meters and a thickness or diameter of about 1 mm. The tether line 14 is selectively wound-up on or unwound from a tether line winch 35 (see FIG. 9) provided in the space platform 1. This winch 35 is controlled, or preferably regulated via a closed regulation loop, by a motor, a tension sensor, an onboard computer of the space platform 1, and/or through a control station based on earth or on a space station or the like. In that regard a camera system may be provided on the space platform 1 with a field of view encompassing the deployment direction and area of the capture net 9, so that operating or control personnel can visually monitor the progress of a capturing process. The space platform 1 preferably also has its own propulsion and guidance control, and the like, so that the space platform 1 can be maneuvered into a suitable position for aiming and then deploying the capture net 9 to enclose and thereby capture the free-flying target object 15 such as a satellite that is to be captured (see FIGS. 8 and 9).

Figure 8:
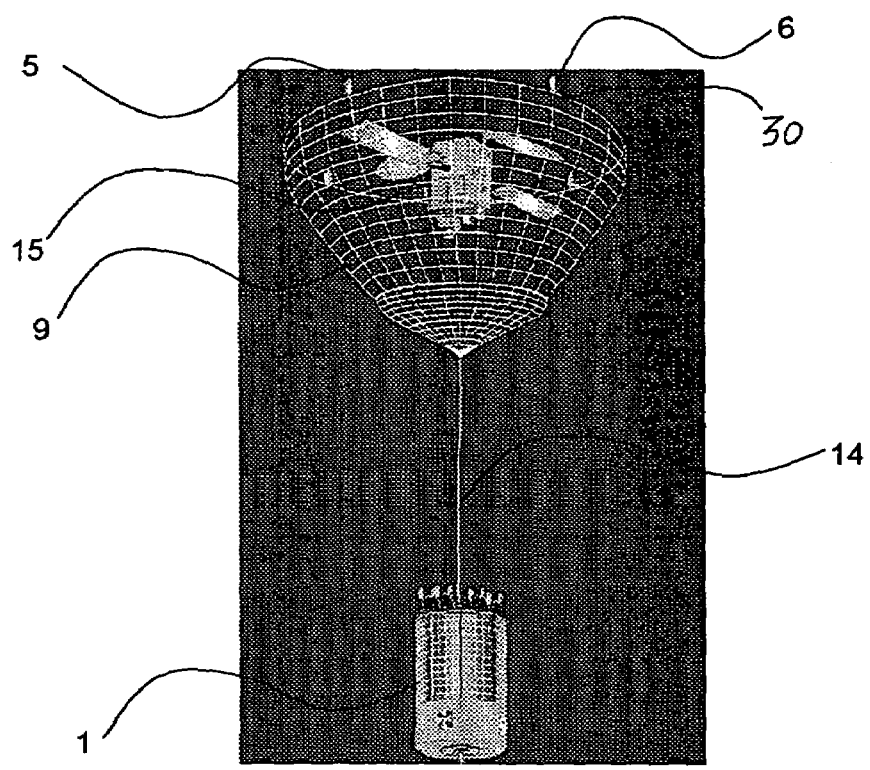
FIG. 8 is a schematic perspective view of the inventive system deployed in space during a process of capturing a satellite as a target object.

The spring-driven ejection and acceleration of the cover 3 and the guide weights 5 to 8 causes the capture net 9 to be launched toward the target object 15, while also spreading open the capture net 9 (see FIG. 8). Upon contacting the target object 15, the capture net 9 begins to wrap around and thus at least partially enclose the target object 15 as the momentum of the guide weights 5 to 8 continues to move the weights past and around the target object 15 subject to the constraint imposed by the net 9 lodging on the target object (see FIG. 9). At this time, net closing mechanisms provided on at least two of the four guide weights 5 to 8 are activated in order to at least partially purse or close the net 9 around or behind the target object 15 (see FIG. 9).

Particularly, in this embodiment, the guide weights 5 and 7 respectively include a net closing mechanism, as represented by the guide weight 5 in FIG. 6. The net closing mechanism includes a rotor acting as a purse line winch drum 16, which is rotatably drivable by an electric motor 17 with a relatively compact construction and small dimensions, e.g. a so-called spin drive, a battery 18 for powering the motor 17, and a micro switch 19 that activates the motor 17 to operate the rotor or winch drum 16. Particularly, the micro switch 19 preferably activates a timer switch, which starts the motor 17 after a prescribed time interval, e.g. 60 seconds, has elapsed after the ejection of the respective guide weight 5 from its associated ejection tube 25. Thus, the actuation of the net closing mechanisms is entirely automatic and self-contained after the initial triggering and deployment of the capture device 2 by releasing the cover 3 thereof.

Figure 9:
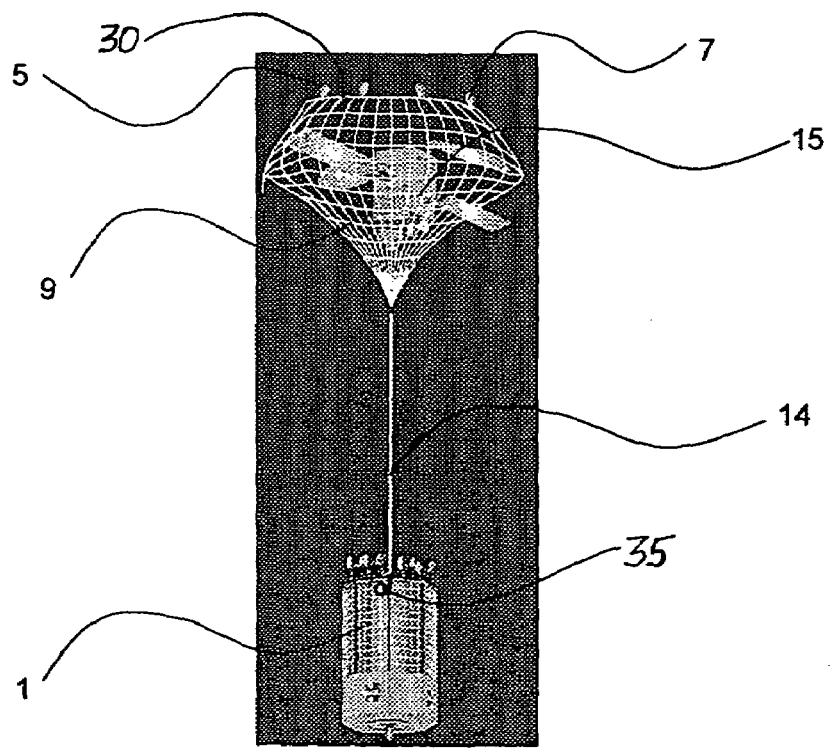
FIG. 9 is a view similar to that of FIG. 8, showing a later stage of the capturing process.

At least one net purse line 30 connects all four of the guide weights 5 to 8 with one another and may preferably extend along the outer perimeter edge or rim of the net 9. This net purse line 30 is connected to the winch drum or rotor 16 of the net closing mechanism. Thus, when the motor 17 is activated by the time switch 19, the rotation of the winch drum or rotor 16 will wind up or reel-in the net purse line 30, thereby drawing or pursing closed the perimeter of the net 9 as shown in FIG. 9. The net is to be closed to at least such an extent that the target object 15 cannot be released and lost out of the remaining opening of the net 9, for example in the event of further or oppositely directed rotational motions. In this regard, the drives of the rotors 16 in the respective guide weights 5 and 7 are provided with devices to prevent or block a reverse rotation, such as, for example, a worm drive or a spindle drive. Moreover, in order to avoid an inherent counter rotation of the body of the respective guide weight 5 due to the reactive torque of the motor 17, the winch drum or rotor 16 preferably cooperates with a line guide eyelet or an outer guide shell through which the net purse line 30 extends, whereby this line guide eyelet or outer shell of the rotor assembly is connected to the nominally non-rotating housing of the motor 17 and battery 18.

In the total system arrangement as shown in FIGS. 1 and 2, the several capture devices 2 may respectively have capture nets 9 with respective different diameters of about 10 m or 15 m, or even larger, as well as a suitably matched mesh size of about 0.3 m to 0.5 m. Thus, the different nets 9 are respectively suitable for different sizes of target objects 15. The system allows an appropriate one or ones of the capture devices 2 to be selected and activated depending on the particular target object 15 to be captured.

After the target object 15 has been captured as shown in FIG. 9, the winch 35 on-board the space platform 1 is activated to control or regulate the extended length of the tether line 14 as well as the tension forces arising therein. This is carried out both during the capture process as well as the subsequent stabilization of the target object, and then during any applicable towing or other transport of the captured target object. For example, the space platform 1 may tow the captured target object 15, for example a satellite, to a new orbit, e.g. a so-called graveyard orbit in the event of a permanently disabled satellite or other space junk. At that new location, the capture net 9 with the object 15 secured therein, as well as the rest of the capture device 2 and the tether line 14 are separated and released from the space platform 1. For this purpose a bolt cutter or cable cutter or other release mechanism is provided on the space platform 1 for severing or otherwise releasing the tether line 14 from the space platform 1.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A system for capturing a free-flying target object in space, comprising:
    a space platform; and
    at least one capture device mounted on said space platform;
    wherein said capture device comprises:
    a capture net;
    a tether line connecting said capture net directly or indirectly to said space platform;
    at least four guide weights connected to a perimeter of said capture net; and
    at least four weight ejection arrangements that are mounted on said space platform, and that respectively receive said guide weights and are adapted to eject said guide weights respectively along weight ejection axes extending respectively at an angle relative to a central axis of said capture device.

2. The system according to claim 1, wherein said capture device further includes a net ejection arrangement adapted to eject said capture net along said central axis.

3. The system according to claim 1, wherein:
said capture device further comprises a housing with an inner space therein;
said capture net is received in an initial folded condition in said inner space of said housing;
said weight ejection arrangements comprise respective weight ejection tubes arranged equidistantly from one another along a circle on a perimeter of said housing, and weight ejection springs respectively arranged in said weight ejection tubes;
said weight ejection tubes are respectively oriented with tube axes thereof extending along said weight ejection axes; and
said guide weights, in an initial condition, are received in said weight ejection tubes, with said springs loaded and bearing against said guide weights outwardly along said weight ejection axes.

4. The system according to claim 3, wherein said capture device is further adapted to release said guide weights from said weight ejection tubes simultaneously with releasing said capture net from said inner space of said housing.

5. The system according to claim 3, wherein said capture device further comprises a cover that is releasably secured to said housing to selectively cover and uncover said inner space of said housing with said capture net therein in said initial folded condition, said cover is connected to said capture net, and said cover further selectively covers and uncovers said guide weights in said weight ejection tubes, so that when said cover is released thereby said capture net is released out of said inner space of said housing and said guide weights are released from said weight ejection tubes to be ejected therefrom by said weight ejection springs.

6. The system according to claim 5, wherein said capture device further comprises a cover ejection spring that spring-biases said cover outwardly along said central axis, so that when said cover is released then said cover ejection spring ejects said cover away from said housing along said central axis.

7. The system according to claim 6, wherein said capture device further comprises a rod connecting said cover to said housing, and a remotely triggerable rod release or rod separating device that can selectively disconnect or separate said rod from said housing and thereby release said cover.

8. The system according to claim 1, wherein at least two of said guide weights respectively each comprise a net closing device that is activatable to draw said perimeter of said capture net at least partially closed.

9. The system according to claim 8, wherein said capture device further comprises at least one net pursing line connecting all of said guide weights to one another, and each said net closing device comprises a rotor driven by an electric motor that is selectively powered by a battery through a switch, wherein one said net pursing line is respectively connected to and can be selectively wound-up on said rotor.

10. The system according to claim 9, wherein said switch incorporates or is connected to a timer that is preset to activate said electric motor at a preset time interval after said guide weight is ejected from said weight ejection arrangement associated therewith.

11. The system according to claim 1, wherein said tether line is arranged and connected so as to have an adjustable length and an adjustable tension between said capture net and said space platform.

12. The system according to claim 11, further comprising a controllable power-driven winch mounted on said space platform, wherein said tether line is connected to and selectively wound-up on and unwound from said winch.

13. The system according to claim 12, further comprising a tension sensor arranged to sense a tension in said tether line, and a controller connected to said tension sensor and said power-driven winch.

14. The system according to claim 12, further comprising a cable cutter or release that is arranged on said space platform and that can be actuated to cut or release said tether line from said space platform.

15. The system according to claim 1, further comprising a camera mounted on said space platform and having a field of view encompassing said central axis of said capture device.

16. The system according to claim 1, comprising at least ten of said capture devices mounted on said space platform.

17. The system according to claim 16, wherein at least some of said capture nets of said capture devices respectively have different net diameters in comparison to one another.

18. The system according to claim 1, wherein said angle is an acute angle.

19. The system according to claim 1, wherein said angle is in a range from 40° to 60°.

* * * * *

UNITED STATES PATENT AND TRADEMARK OFFICE
CERTIFICATE OF CORRECTION

| | |
|---|---|
| PATENT NO. | : 7,168,660 B2 |
| APPLICATION NO. | : 10/943769 |
| DATED | : January 30, 2007 |
| INVENTOR(S) | : Bischof et al. |

It is certified that error appears in the above-identified patent and that said Letters Patent is hereby corrected as shown below:

<u>Title page</u>,
Item [73], Assignee,
Line 1, after "Space", replace "Transportaiton" by --Transportation--;

<u>Column 8</u>,
Line 48, after "from", replace "40°to" by --40° to--.

Signed and Sealed this

Tenth Day of July, 2007

JON W. DUDAS
*Director of the United States Patent and Trademark Office*